2 Sheets—Sheet 1.

McMillen, Knoll, Henry, & Knoll,
Cutting Shingles.

N° 1,319.    Patented Sep. 10, 1839.

2 Sheets—Sheet 2.

McMillen, Knoll, Henry, & Knoll,
Cutting Shingles.

N°1,319. Patented Sep. 10, 1839.

UNITED STATES PATENT OFFICE.

DANIEL C. McMILLAN AND JOHN B. KNOLL, OF PERSIA, THOMAS S. HENRY, OF COLLINS, AND MATHEW KNOLL, OF TULLY, NEW YORK.

MACHINE FOR CUTTING SHINGLES FROM STEAMED, BOILED, OR OTHER TIMBER.

Specification of Letters Patent No. 1,319, dated September 10, 1839.

*To all whom it may concern:*

Be it known that we, DANIEL C. McMILLAN and JOHN B. KNOLL, of Persia, in the county of Cattaraugus, THOMAS S. HENRY, of Collins, in the county of Erie, and MATHEW KNOLL, of Tully, in the county of Onondaga, all in the State of New York, have invented certain Improvements in Machines for Cutting Shingles from Steamed, Boiled, or other Timber, by means of which improvements the timber to be cut is vibrated so as alternately to produce a butt and tip at either end and is fed up to the knife in a more advantageous manner than has hitherto been effected; and we do hereby declare that the following is a full and exact description thereof.

The knife by which the shingles are to be cut extends across a vibrating frame, or gate, which works up and down between fender posts, or cheek pieces, in a vertical frame. The bolt, or timber, from which the shingles are to be cut, is placed upon a head block resting upon a table in front of the machine, said bolt, or timber, being held firmly on the head block, by means of suitable dogs, or other devices. A vibratory, and also a progressive, motion is given to the head block by which the slope and thickness of the shingle are regulated.

Figure 1:
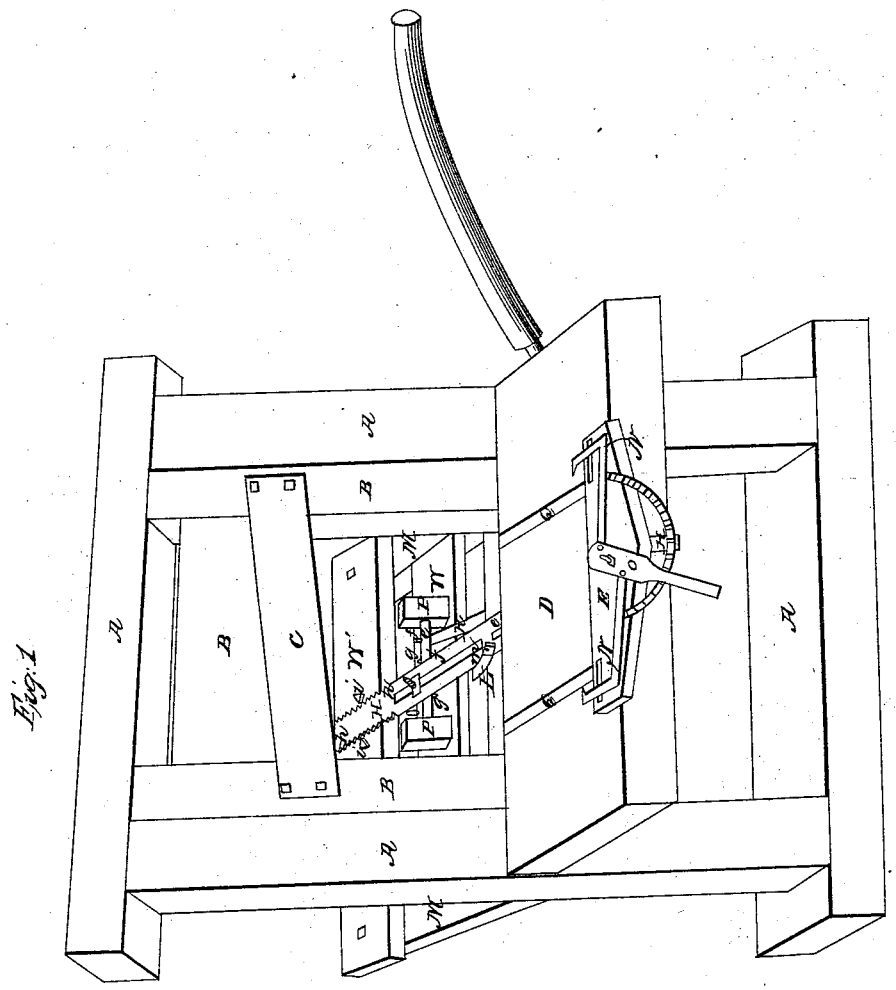

Figure 1 is a perspective representation of the machine, A, A, A, being the stationary frame within which the gate B, carrying the knife C, works up and down.

D, is a flat table fixed to the frame A, A of the machine, and E, the head block upon which the bolt, or timber, is to be held, which may be effected by means of the dogs N, N, operated by the lever O, as in some other machines; *a, a,* is a segment of a circle which may have notches on its face to receive the handle O, and hold it in any required position.

Figure 2:
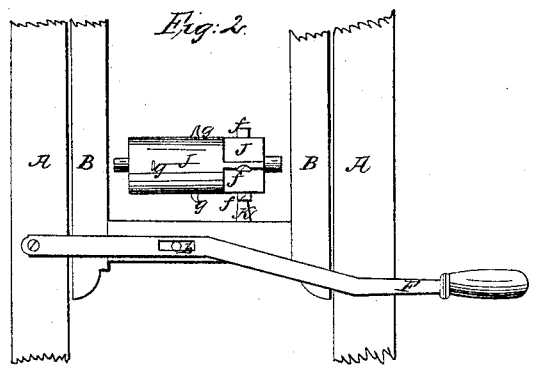

Q, Q, are strips, or flat bars, of iron serving as ways upon which the head block may vibrate, and slide. F, is a lever by which the frame B, is to be made to vibrate, and this may be operated upon by water, animal, or other, power, in ways perfectly well known to machinists. The connection of the lever F, with the vibrating frame B, is shown at *b,* Fig. 2, which is a front view of that part of the frame.

M, M, W, W', are pieces of timber constituting the back frame for supporting the vibrating apparatus and its appendages.

Figure 3:
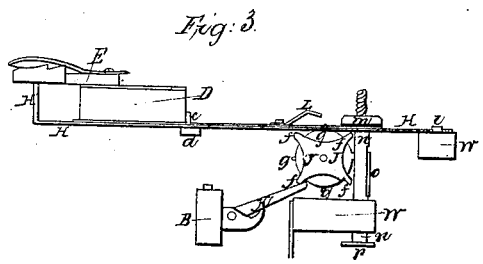

H, is a flat vibrating bar, or lever, which serves to vibrate and advance the timber upon the head block; at its rear end, it rests upon the cross timber, W'; it extends forward under the table D, and is fastened to the lower side of the head block E; this is shown in the vertical cross section Fig. 3, where W', is the back cross timber, D, the table, and F, the head block. The lever H, bends up at its fore end H', and is fastened to the head block E. This lever vibrates upon a pin *c,* attached to a bar *d,* Figs. 3 and 4, which crosses from one fender post to the other immediately under the knife, and below the table D, the pin *c,* passing into the slot *e,* which allows the lever H, to move back and forth, and also to vibrate upon the pin.

Figure 4:
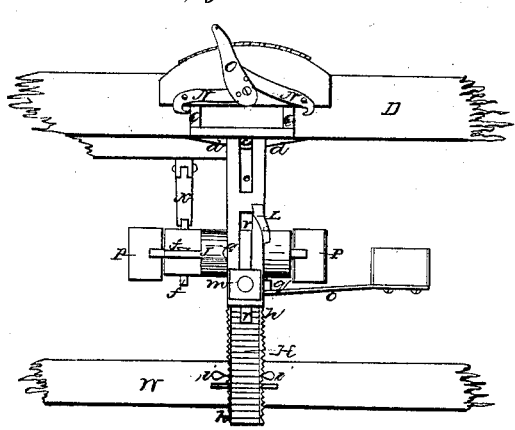

P, P, are two standards which rise from the cross timber W, Figs. 1, and 4, and support a revolving cylinder J, Figs. 1, 2, 3, and 4, by which the lever H, is made to vibrate and advance. Upon one end of the cylinder, there are four projecting pins *f, f, f, f,* and a part of the cylinder is cut away between them to allow of the free action of a pawl, or hand, K, which is to act upon them and cause the cylinder at each contact to make one-fourth of a revolution. The hand K, is attached to, and works upon, a joint on the lower rail of the knife frame, the joint allowing of its free descent over the pin upon which it is next to act. The lever H, is made to vibrate by means of four beveled pins *g, g,* rising from the cylinder J, and coming alternately into contact with opposite sides of the lever H, the edges of which are also beveled, so that it is wedged, or pushed over, from side to side, to the proper distance to give the desired slope to the shingle. To cause the head block to advance as well as to vibrate, the rear end of the lever H, has angular teeth formed upon each of its sides, as at *h, h;* and there are two angular teeth *i, i,* which rise from the timber W', which teeth alternately engage with those of the lever H, as it is wedged over from side to side, these draw it forward the thickness of a shingle.

Figure 5:
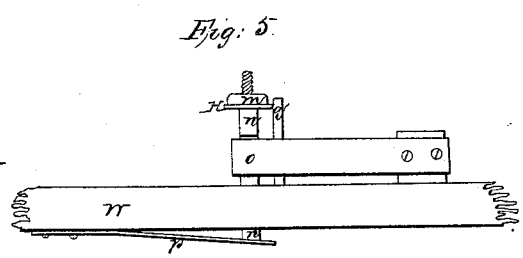

When the butt, or timber, has advanced so as to bring the head block close to the knife, the lever H, is thrown out of gear by the following means; *m,* in the respective figures, is a screw nut, fitting on to a screw on the upper end of a bolt *n,* which is capable of sliding up and down in the back part of the timber W, and when the bolt is held down, the lever H, is in gear with the teeth $i$, $i$, and with the pins $g$, $g$, on the cylinder J; but when the bolt $n$, is raised, the lever H, is lifted out of gear. Fig. 5, is a back view of a part of the machine showing this bolt and its appendages. In the bolt $n$, there is a recess into which the end of a spring, $o$, is received and which when in place holds the bolt $n$, down; $p$, is a spring which bears upon the bottom of this bolt, and forces it up when not held down by the spring $o$. To disengage this, there is a lever $q$ which passes up immediately within the spring $o$; and upon the vibrating lever H, there is a disengaging piece L, which as it advances comes into contact with the upper end of the lever $q$, and throws the machine out of gear. The screw part of the bolt $n$, passes through a slot $r$, $r$, in the lever H, to allow of the advancing motion of the said lever.

Instead of forming the angular teeth on the outer edges of the lever H, said lever may be divided into two parallel parts, by a slot, or opening, along it, and the teeth may be formed on the two interior edges.

Having thus fully described the construction of our machine and shown the manner in which the same operates, we wish it to be distinctly understood that we do not claim the manner of cutting shingles by means of a knife attached to a vibrating frame, or gate, nor do we claim the manner of securing the bolt, or timber, upon the head block; but we limit our claim to the manner of vibrating, and of feeding the stuff to the knife, and of disengaging the vibrating lever; that is to say, we claim—

1. The manner in which we cause the vibrating lever to vibrate and advance, by the combined operation of the revolving cylinder, furnishes with the beveled pins $g$, $g$, acting upon said lever, the cylinder being made to revolve in the manner set forth, and the lever, and, consequently, the head block, being made to advance by the combined action thereon, of the teeth $h$, $h$, and $i$, $i$, as set forth.

2. We also claim the particular arrangement of the parts for throwing the vibrating lever out of gear, by the combined operation of the disengaging piece L, the bolt $n$, the lever $q$, and the spring $p$, constructed and arranged, substantially, in the manner described.

DANIEL C. McMILLAN.
JOHN B. KNOLL.
THOS. S. HENRY.
MATHEW KNOLL.

Witnesses:
JOHN B. WILBOR,
JAMES M. RICH.